Dec. 26, 1950 R. E. DENSLOW 2,535,271
SAFETY SWITCH FOR THE LIGHT SYSTEMS OF VEHICLES
Filed Feb. 5, 1948

Ralph E. Denslow
INVENTOR.

BY *Clarence A. O'Brien
and Harvey B. Jacobson*
Attorneys

Patented Dec. 26, 1950

2,535,271

UNITED STATES PATENT OFFICE 2,535,271

SAFETY SWITCH FOR THE LIGHT SYSTEMS OF VEHICLES

Ralph E. Denslow, Salem, Oreg.

Application February 5, 1948, Serial No. 6,518

2 Claims. (Cl. 200—117)

1

This invention relates to safety systems and safety switches used on vehicles especially on automobiles, trucks or the like and it has for its main and principal object to provide a system in which one light circuit which is independent of all the other light current supplying systems of the vehicles, is automatically brought into operation when the operation on the normal light circuit ceases on account of a short circuit or of a similar defect.

It will be easily understood that the burning out of a main fuse or of one of the fuses connected with the headlight circuit may occur at any moment, whatever the speed or the conditions of driving and that the sudden extinction of the lights used by the driver to illuminate his field of operation, is highly dangerous and likely to cause accidents, as the vehicle may run over a considerable stretch before being stopped. It has therefore been proposed to use special safety lamps or safety circuits which come into operation when the current to the headlights or to other lamps fails.

Usually such safety appliances use an electromagnetic switch having a winding inserted into the circuit of the main lights or into a circuit connected therewith which, when deenergized, closes an auxiliary circuit including the second pair of lights with which headlights are customarily equipped. Therefore if the car is driven with full lights, the dimmed or tilted lights are coming into action upon the occurrence of a short circuit which otherwise would extinguish the lights. Likewise if the dimmed or tilted lights are in use, and are suddenly extinguished the full lights are restored as emergency lights.

This arrangement, while providing safety in the event that one of the headlight circuits is short circuited, does not provide safety in the event that the disturbance arises in the switch or in a conductor in front of the switch and it uses an electromagnetic relay or solenoid arrangement which is a complication.

The invention has therefore for its object to provide an arrangement of the greatest possible simplicity which uses special emergency lights completely separated from and independent of the headlight or other light circuits.

A further object of the invention consists in using the fog lights for this purpose and in using a fog light supply circuit which is completely separate from and independent of the other light circuits.

A further object of the invention consists in providing an arrangement in which a special safety switch is used, with a switch blade held by a fuse in a position in which the current supplied to the lights will flow over said fuse, but which automatically falls back into a second position, as soon as the fuse is no longer capable of holding the switch blade, thereby shifting the connection of the switch blade with the battery to a second fuse which forms part of an independent emergency light circuit, formed preferably by the fog lights.

A further object of the invention consists in providing an emergency light circuit, preferably including the fog lights which is completely independent of and separated from the circuits of the other lights (such as headlights, taillights, parking lights, etc.) but which is provided with two supply circuit branches, one for the use of these lights, controlled by the driver and the other connected with a safety switch for automatic operation of the said lights as emergency lights in the manner above set forth.

Further more specific objects will be apparent from the following specification.

The inventive concept is capable of being embodied in a plurality of constructions but only one such embodiment is shown by way of example in order to explain the principle of the invention and the best mode of applying it. It will however be understood that other modes of applying the same principle may embody the invention as well and modifications of the example shown are therefore not necessarily departures from the invention.

Figure 1:
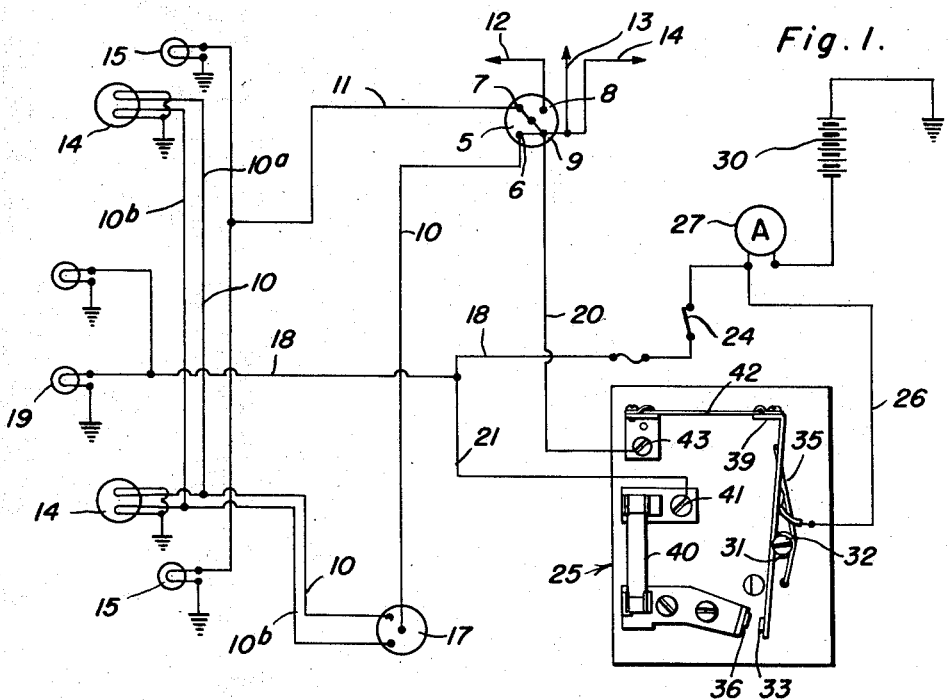
Figure 1 is a diagram illustrating the system.

In the safety system according to the invention the lighting system of the car, including all the lights used such as headlights, taillights, stop lights and also other circuits necessary for operation, such as dome light circuits, horn circuit and the like, are customarily controlled by a main light switch 5, only represented diagrammatically in Figure 1 as this switch is a standardized unit. It comprises a plurality of fixed contacts 6, 7, 8, 9 shown diagrammatically to which the wires 10, 11, 12, 13, 14 for the operating circuits of the car lead. Some of these wires such as those leading to the taillights, to the instrument panel, to the dome lights, to the stop lights, to the operating circuit of the horn, etc. are merely indicated by lines provided with arrows, while the circuit for the headlights 14 and the parking lights 15 are shown more fully. The headlight circuit 10 includes customarily the dimmer switch 17, and comprises two branches 10a and 10b for dimmed and undimmed lights. It is connected with contact 6 while the parking light circuit 11 is connected with contact 7 of the main light switch 5.

In addition a fog light circuit 18 is shown, leading to the fog lights 19 which according to the invention are used as emergency lights.

The main supply conductor 20 for main light switch 5 and a supply conductor 21 of the fog and emergency lights leads to the safety switch 25 which is connected by means of conductor 26 with the ammeter 27 and the battery 30.

In order to make the fog lights usable independently of their function as emergency lights the circuit 18 is directly connected with conductor 26 and contains a normally open hand operated switch 24 which may be closed whenever the driver wants to use the foglights during normal operation.

The safety switch 25 comprises a casing 28 housing a switch blade 31 mounted on a pivot 32, and provided with a special non-corrosive contact knob 33. The switch blade has a bent end portion 39 and is under the tension of a strong spring 35 which tends to move the blade 31 towards a fixed contact 36 mounted on a contact strip 37 which also holds one of the elastic spring contacts 38 for receiving a fuse 40, the other side of which is held between similar spring contacts 38a of a binding post 41.

A second fuse 42 consisting of a strip of fusible metal is attached to the bent end portion 39 of switch blade 31 and holds the same against the action of the spring in a position in which the contacts 33 and 36 are spaced from each other. The fuse is fixed to the binding post 43.

Figure 2:
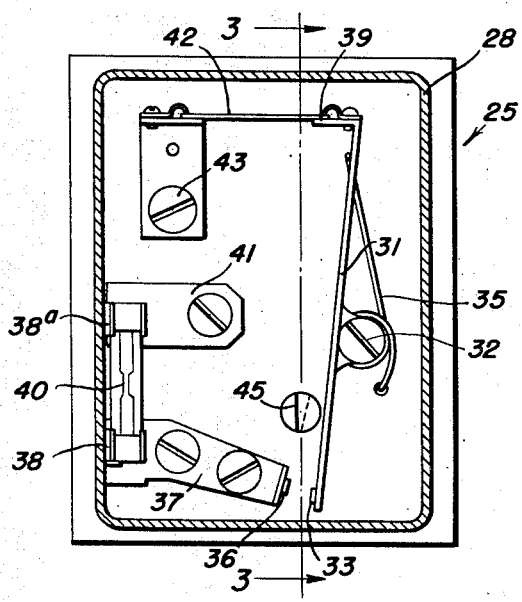
Figure 2 and Figure 3 are elevational side views of the safety switch forming the most important part of the system, the casing of the switch being shown in section with the section in Figure 3 being taken along line 3—3 of Figure 2.
Figure 3:
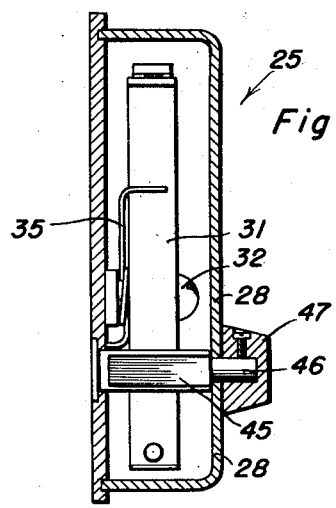

An eccentric cam 45, preferably of insulating material or a bolt with a suitably flattened or shaped head is provided near the switch blade 31. This cam is rotatable and is fixed to or integral with a bolt 46 which projects through the casing 28 of the switch and carries an insulating knob 47. The cam 45 is so arranged that in one position it clears the blade and permits its movement towards the second contact while when turned around it will move the blade when in its contact position away from the said position into the position shown in Figure 2 and will interrupt the circuit of the fog lights.

As seen from the diagram the blade 31 is connected with conductor 26 leading to the ammeter 27 and the battery 30 while binding post 41 is connected with supply conductor 21 for the emergency light circuit 18 and binding post 43 is connected with the main supply conductor 20.

From the foregoing it will be clear that in the event that the fuse 42 of the main supply conductor 20 should burn out on account of a short circuit in any of the lights or other operative circuits connected with the main switch 5, the switch blade 31 which is now no longer held at its end 39 will snap into its closed position under the influence of spring 35.

Thereby the circuit from the battery 30 is switched through contacts 33 and 36 to the conductor 21 which contains fuse 40. Whatever may have happened in the aforesaid circuits connected with switch 5 does not in any way affect circuit 21 and 18 which is practically a completely independent circuit. Therefore the fog lights light up at the same moment at which the other lights go out.

The cam eccentric moving the blade 31 is then used to make or break the circuit of the fog lights as long as these lights are supplied by conductor 21 over the blade 31.

As above stated the fog lights may also be lighted independently by closing the normally open switch 24.

It is to be understood that constructive changes of a non-essential nature do not in any way affect the safety system as above described and as claimed hereinafter.

Having described the invention, what is claimed as new is:

1. A safety switch for the lights of automotive vehicles adapted to switch connections between a source of current and a main light circuit on one hand and a separate additional supply circuit for auxiliary lights arranged in parallel to a normal supply circuit provided with a switch and fuse on the other hand, comprising a closed casing, a pivot pin therein, a rigid switch blade within said casing with a bent end and with a contact knob at the other end, mounted on and swingable around said pivot pin, means for connecting said blade with the source of current, a fixed contact strip with a fixed contact knob in said casing, the said knob facing the contact knob on the switch blade, a coiled spring around said pivot pin, urging the end of the switch blade carrying the contact knob towards the fixed contact, a terminal post in said casing adapted to be connected with the main light circuit, a straight strip of fusible material fixedly attached to said terminal post and to the bent end of the switch blade, the length of said strip being selected, so as to hold the other end of the switch blade at a distance from the fixed contact knob against the spring tension, said fusible strip being part of the connection leading from the source of current connected to the switch blade to the main headlights, a fuse contact holder for a removable fuse on said contact strip, a binding post provided with a second fuse contact holder near said contact strip within the casing, said binding post being connectable with the auxiliary light circuit and a removable fuse for the auxiliary light circuit held within said fuse contact holders for independent protection of the auxiliary circuit switched in when the strip of the fusible material in the main light circuit has been melted and has released the switch blade.

2. A safety switch as claimed in claim 1, comprising an eccentric cam at a distance from the pivot pin within the casing, a shaft passing through the casing to the outside and an operating knob on the outside, said knob and cam forming a control switch for the auxiliary light circuit upon melting of the fuse in the main circuit.

RALPH E. DENSLOW.

REFERENCES CITED

The following references are of record in the file of this patent:

UNITED STATES PATENTS

| Number | Name | Date |
|---|---|---|
| 430,967 | Miller | June 24, 1890 |
| 837,097 | Moorer | Nov. 27, 1906 |
| 1,521,176 | Frank | Dec. 30, 1924 |
| 1,815,294 | Gildner | July 21, 1931 |
| 1,859,377 | Boudion | May 24, 1932 |
| 1,925,209 | Miller | Sept. 5, 1933 |
| 1,938,828 | Gordon | Dec. 12, 1933 |
| 2,131,664 | Johansen | Sept. 27, 1938 |
| 2,255,470 | Matthews | Sept. 9, 1941 |
| 2,381,169 | Jones | Aug. 7, 1945 |
| 2,427,076 | Tabbacchi | Sept. 9, 1947 |